# 2,922,739

O-HYDROCARBON, S-(QUATERNARY AMMONIUM-SUBSTITUTED ALKYL) ESTERS OF PHOSPHOROTHIOIC ACIDS AND INSECTICIDAL COMPOSITIONS THEREOF

Jack A. Snyder, Claymont, Del., assignor to E. I. du Pont de Nemours and Company, Wilmington, Del., a corporation of Delaware No Drawing. Application January 31, 1958
Serial No. 712,310

5 Claims. (Cl. 167—22)

This invention relates to certain novel organophosphorus compounds, to methods for their preparation, and to compositions and methods for their use.

This application is a continuation-in-part of application Serial No. 466,666, filed November 3, 1954, now abandoned; and also a continuation-in-part of application Serial No. 495,322, filed March 18, 1955, now abandoned.

More particularly, the novel compounds of this invention are certain di-O,S-hydrocarbon esters of phosphorothioic acid and phosphorodithioic acid represented by the formula (1)
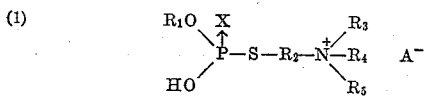

where:

X is oxygen or sulfur
$R_1$ is hydrocarbon radical of less than 8 carbon atoms
$R_2$ is an alkylene radical of 2 to 4 carbon atoms
$R_3$, $R_4$ and $R_5$ are the same or different and are hydrocarbon radicals of less than 8 carbon atoms with the proviso that $R_4$ and $R_5$ can be taken together to form, with the nitrogen atom between them, a heterocyclic group
A is an anionic salt-forming group More particularly the compounds of the invention are those of Formula 1 where:

X is selected from the group consisting of oxygen and sulfur
$R_1$ is selected from the group consisting of alkyl radicals of from 1 to 4 carbon atoms, inclusive, alkenyl of 2 to 4 carbon atoms, benzyl, phenyl, halophenyl, nitrophenyl, and tolyl radicals
$R_2$ is an alkylene radical of from 2 to 4 carbon atoms
$R_3$ is selected from the group consisting of alkyl radicals of from 1 to 4 carbon atoms, inclusive, and alkenyl radicals of 2 to 4 carbon atoms
$R_4$ and $R_5$ are the same and are alkyl radicals of from 1 to 4 carbon atoms, inclusive, or alkenyl radicals of 2 to 4 carbon atoms with the proviso that they can be taken together to form, with the included nitrogen, the pyrrolidine, piperidine, piperazine and morpholine rings
A is selected from the group consisting of halogen, alkyl sulfate of from 1 to 4 carbon atoms, inclusive, benzenesulfonate, and toluene-sulfonate From the above, it will be seen that the compounds of the invention can be named generically as salts of O-hydrocarbon, S-(quaternary ammonium-substituted alkyl) esters of phosphorothioic acid and phosphorodithioic acid.

The compounds of this invention are especially distinguished because of their outstanding insecticidal properties and in particular by their systemic insecticidal properties. They are also useful as petroleum additives.

It will be understood that the terms "insect" and "insecticide" are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, Section 2, Subsection $h$, wherein the term "insect" is used to refer not only to those small invertebrate animals belonging mostly to the class Insecta, comprising six-legged, usually-winged forms, as beetles, bugs, bees, flies, and so forth, but also to other allied classes of arthropods whose members are wingless and usually have more than six legs, as spiders, mites, ticks, centipedes and wood lice.

The compounds of the invention are readily prepared as illustrated by the following equations showing specific reactants:

(2)
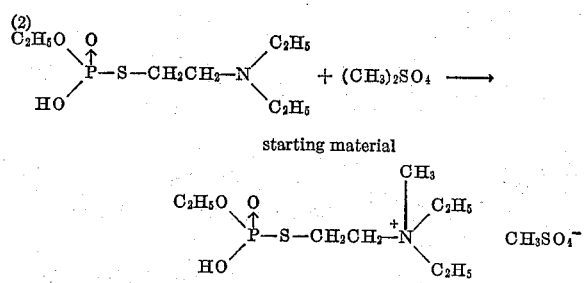

The preparation of the starting materials of Equation 2 and analogs thereof, all of which can be used as intermediates in preparing compounds of the present invention, are disclosed and claimed in my copending application, Serial No. 495,321, wherein detailed methods for their preparation are set forth. Briefly, the formation of the above starting material is described by the following equation:

(3)
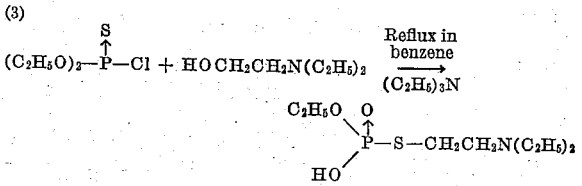

This may be broken down into the following steps, which occur consecutively to give the overall reaction above.

(a) CONDENSATION
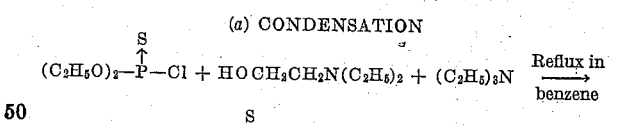

(b) ISOMERIZATION
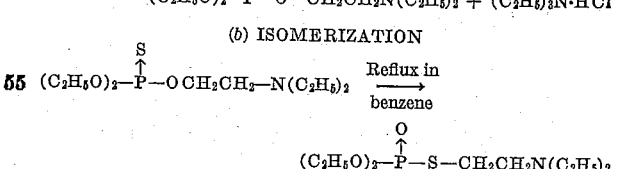

This isomerization is noted by R. Ghosh and J. F. Newman, Chem. and Ind., Jan. 29, 1955, p. 118, for the above compound, and is further described for this compound by T. R. Fukuto and E. M. Stafford, J. Am. Chem. Soc. 79, 6083 (1957).

(c) CLEAVAGE
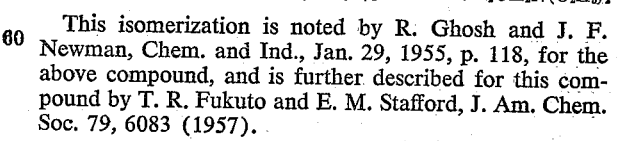
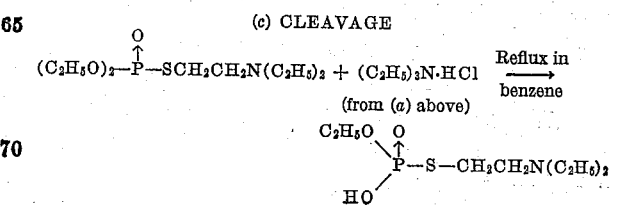

There are vague literature references to this type of reaction, although it has remained for me to show the specificity of the cleavage of O-alkyl groups from O,S-dialkyl phosphate esters by trialkylamine hydrochlorides or lithium chloride.

V. M. Clark and A. R. Todd, J. Chem. Soc., 2023 (1950), ibid., 2030 (1950), describe the cleavage of benzyl groups (very easily removed) from phosphate esters with amine salts and inorganic salts.

J. Lecocq and A. R. Todd, J. Chem. Soc., 2381 (1954), describe the cleavage of lower alkyl groups from thiolphosphate esters having electron-withdrawing groups such as phenyl, using lithium chloride.

L. Zervas and I. Dilaris, J. Am. Chem. Soc. 77, 5354 (1955), have shown the cleavage of alkyl groups from trialkyl phosphates, using sodium or barium iodide, stronger reagents than amine hydrochlorides or lithium chloride.

Perhaps the most pertinent of these is the second reference. None of these authors tried cleaving mixed O-alkyl, S-alkyl esters. If they had, they would have found that possession of an S-alkyl group activates the ester so that amine hydrochlorides or lithium halides can cleave an O-alkyl. The cleavage is illustrated by the following reactions which I have carried out:

(4)
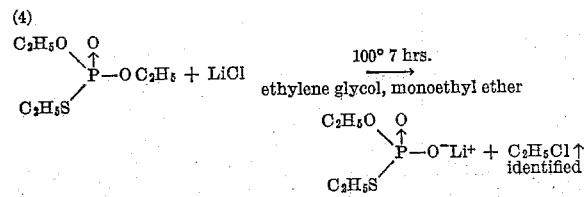

The peculiar influence of the S-alkyl group is confirmed by:

(5)
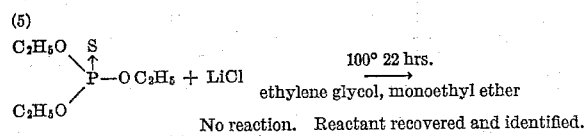

This cleavage reaction also operates where the S-alkyl "activating group" is S-(2-diethylaminoethyl-) in Reaction c. Here, also, an O-ethyl is cleaved.

Therefore, the Reaction 3 given, by which the intermediate arises, is a shorthand form of the situation expressed in the sequence $(a) \rightarrow (b) \rightarrow (c)$. I have indicated this by synthesizing the product of $(b)$ and cleaving it with triethylamine hydrochloride in ethylene glycol, monoethyl ether to give a product identical with the product of Reaction 3.

It may thus be seen that an alternative method to the use of the reaction of Equation 3 for preparing the starting material is Equation c. Preparation of the trialkyl ester used as starting material in Reaction c is described in the Fukuto and Stafford reference given above.

The reaction of Equation 3 above is preferably carried out in an inert organic solvent such as benzene, chlorobenzene, toluene, xylene, octane, tetrahydrofuran and the like and is speeded by heating, say at reflux temperature. An acid-accepting amine such as triethylamine is used in the process.

The alternative Reaction c above is preferably carried out in an inert organic solvent such as those given above, or more preferably an ethylene glycol, monoalkyl ether, using an amine hydrochloride such as trimethylamine hydrochloride or triethylamine hydrochloride or by using an alkali metal halide, preferably lithium chloride. The reaction is speeded by heating.

The reaction of Equation 2 above is preferably carried out in an inert organic solvent such as benzene, toluene, xylene, dialkyl ether, tetrahydrofuran, chloroform, carbon tetrachloride and the like. It ordinarily proceeds at room temperature but elevated temperatures can be used if desired.

In order to use the compounds of the invention to best advantage as insecticides, they are formulated with an inert carrier, such material sometimes also being referred to in the art as a modifier or conditioning agent or in some cases a diluent or extender. Such formulation is desirable in order to provide compositions adapted for ready and efficient application to insects or loci to be protected therefrom using conventional applicator equipment. Thus the compounds are formulated in compositions which take the form of solutions, dusts, water-dispersible powders, emulsions, aerosols and the like. They can also be used in insect baits in the form of a dispersion on a dry carrier with an attractant or in the form of a syrup.

By the term "inert carrier," I mean a substance which is capable of presenting or aiding in the presentation of an active compound to an insect. The term "carrier" is well established in the art where it is recognized that an active agent or toxicant is in itself of little practical utility for combating insects unless it be presented in a form suitable for effecting intimate contact of the agent or its vapors, as the particular case may require, with the insect. Thus additional material or materials are employed in formulating at least one active agent of Formula 1 to yield a suitable insect control composition, such materials being adjuvants.

Suitable inert carriers that can be used in the compositions include wetting, dispersing, and emulsifying agents set out in U.S. Patent 2,655,445 can be employed in preparing the pest control compositions of the present invention. Other suitable wetting, dispersing and emulsifying agents such as those listed in detail in articles by McCutcheon in Soap and Sanitary Chemicals, August, September, and October of 1949 can also be used. Preferably, however, the wetting, dispersing or emulsifying agents used in the pest control compositions of the invention are of the cationic and nonionic types.

Compositions of the invention are usually first prepared in the form of "concentrates" suitable for solution or dispersion in water to give aqueous spray compositions. The compounds of the invention are generally water soluble and suitable concentrates can therefore be prepared by admixing a wetting, dispersing, or emulsifying agent with one or more of the compounds of Forula 1 in otherwise undiluted form. Although the wetting, dispersing, or emulsifying agent can be used in large amounts, say up to 50 percent or more of the formulation, ordinarily it will not comprise more than 20 percent by weight of the formulation, and with the better of such adjuvant materials the percentage will be 5 percent or less.

Dust compositions of the invention contain one or more compounds of Formula 1 admixed with or adsorbed on finely divided carriers or dusts such as talc, pyrophyllite, natural clays, diatomaceous earths, and other powdered diluents such as those set out in the aforementioned U.S. patent. The dust compositions are prepared by intimately mixing the compounds of Forumla 1 with a powdered carrier.

Because the compounds of the invention are in general viscous liquids, the maximum concentration of such compounds in a dust composition or water soluble powder of the invention will, of course, vary with the adsorptivity of the particular powder diluent used. For example, if fuller's earth is used, the dust may contain as much as about 25 percent by weight of a liquid compound of the invention. Using a less adsorptive diluent such as pyrophyllite, however, it is necessary to reduce the content of liquid compound appreciably in order to obtain a free-flowing powdered pest control composition.

Preferred water-dispersible powders of the invention contain of the order of about 25 percent or less by weight of a compound of the invention dispersed on a highly adsorbent inert powdered diluent such as fuller's earth or diatomaceous earth. Such water-dispersible powders can also contain an effective amount of a dispersing or emulsifying agent. Usually such powders will contain less than 10 percent by weight of the dispersing or emlusifying agent.

In actual application of the compositions for insect control, it is generally preferred that the active compound or compounds be present in relatively low concentrations. Thus, the "concentrates" are dissolved or dispersed in water to obtain aqueous compositions of suitable concentration for practical application.

In applying the compounds of the invention for insect control, the compound is, of course, applied in amount sufficient to exert the desired insecticidal action. The amounts required, however, to give insecticidal action are extremely small because of their unusual effectiveness.

The compounds are applied to the locus or area to be protected. Such application can be made directly upon the locus or area and the insects thereon during the period of infestation or, alternatively, the application can be made in advance of an anticipated insect infestation or otherwise applied so that the insects will come into contact with the active compound and be killed.

The compositions of the invention can include fungicides such as zinc dimethyldithiocarbamate, zinc ethylene bis-dithiocarbamate and manganese ethylene bis-dithiocarbamate, insecticides such as DDT, methoxychlor, chlordane, parathion, EPN, dieldrin, aldrin and malathion, and other fungicides and insecticides such as those set out in U.S. Patent 2,426,417.

In order that the invention may be better understood, the following additional examples are given. Because standard rules for naming many types of organophosphorus compounds have not been set forth by the various organizations which establish the rules of chemical nomenclature, the naming system used here will be described.

A hypothetical "hydrolysis" of the compound as performed at the site of the S—C bond. The quaternary-substituted alcohol which results is then named. To describe the compounds of the invention it is only necessary to give the name of the quaternary-substituted alcohol and to state that the compounds are S-esters of that alcohol with the phosphorothioic or phosphorodithioic acid moiety obtained in the "hydrolysis"

(6)

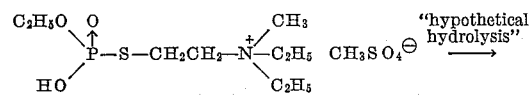

diethyl (2-hydroxyethyl)methylammonium methyl sulfate, S-ester with phosphorothioic acid, O-ethyl ester

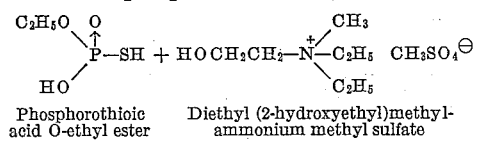

Phosphorothioic acid O-ethyl ester    Diethyl (2-hydroxyethyl)methylammonium methyl sulfate

EXAMPLE 1

*Preparation of diethyl (2-hydroxyethyl)methylammonium methyl sulfate, S-ester with phosphorothioic acid, O-ethyl ester*

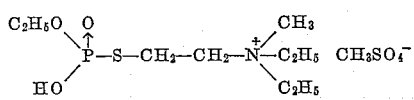

Phosphorothioic acid, O-ethyl, S-(2-diethyl aminoethyl)ester, a starting material used in the preparation of the compound of this example, is first obtained as follows:

METHOD OF EQUATION 3

A mixture of 58.5 g. of 2-diethylaminoethanol, 0.5 mole, 94.5 g. of diethyl chlorothionophosphate, 0.5 mole, triethylamine, 50.5 g., 0.5 mole, and benzene, 500 ml., was stirred and refluxed 2 hrs. on a steam bath in a 1000-ml. round-bottom flask with a stirrer and condenser with drying tube. It was then cooled to room temperature and filtered. The crystals were washed with two 50-ml. portions of benzene and sucked dry. The yield was 35 g., 51 percent, calculated as triethylamine hydrochloride. The filtrate and washings were combined and extracted with two 100-ml. portions of water. The water extracts were combined and extracted with two 100-ml. portions of nitromethane. A 20.8 g. portion of the sample was dissolved in 50 ml. of water (pH 6) and passed over a column of Amberlite IR4B ion-exchange resin, the first 30 ml. of effluent, column holdup, being discarded. The effluent (pH 8) was collected, volume 100 ml. This was passed over Amberlite IRC50 resin, 30 ml. being discarded, and 150 ml. (pH 2) being collected. This was again passed over IR4B resin, 30 ml. being discarded and 200 ml. (pH 6–7) being collected. This solution was concentrated to a thick, light yellow sirup in vacuo (90° bath), and dried by heating ½ hr. at 90°/0.1 mm. The yield was 14.2 g., 68 percent. Sulfur, nitrogen and phosphorus were present; halogen was absent.

Calcd. for: $C_8N_{20}NO_3PS$: C, 39.8; H, 8.36. Found: C, 39.3; H, 8.65.

METHOD OF EQUATION c

A solution of 6.72 g., 0.025 mole, of phosphorothioic acid, O,O-diethyl, S-(2-diethylaminoethyl)ester (see Fukuto and Stafford reference), 10.25 g., 0.075 mole, of triethylamine hydrochloride, and 50 ml. of ethylene glycol, monoethyl ether was heated at 100° on a steam bath in a 100 ml. round-bottom flask with condenser and drying tube for 6 hrs. It was then allowed to cool to room temperature and stand overnight. The crystals were filtered, washed with 50 ml. of ether, sucked dry, and air-dried for 1 hr. The yield was 5.73 g., M.P. 221–235° (uncorr.), impure triethylamine hydrochloride. The filtrate, 55 ml., and washings (diluted to 55 ml. with ether) were combined and allowed to stand 15 min. at room temperature. The crystals were filtered, washed with 50 ml. of ether, sucked dry, and air-dried ½ hour. The yield was 2.71 g., M.P. 201–218° (uncorr.). The filtrate and washings were combined and concentrated to a sirup in vacuo (90° bath). This amounted to 7.26 g. after drying 15 min. at 90°/0.1 mm. It was dissolved in 50 ml. of water and extracted with two 50-ml. portions of nitromethane. The water layer was concentrated to a sirup in vacuo (90° bath) and dried 15 min. at 90°/0.1 mm. The yield was 4.85 g., 80 percent. This was dissolved in 25 ml. of water and passed over Amberlite IR4B ion-exchange resin (effluent pH 8), IRC50 resin (effluent pH 2) and IR4B resin (effluent pH 7) in exactly the same procedure as used in the above procedure except for adjusting effluent volumes for the sample volume used. The final effluent was concentrated to a sirup in vacuo (90° bath), which was dried by heating 15 min. at 90°/0.1 mm. The yield was 2.96 g., 61 percent. The infrared spectrum was found to be qualitatively identical with that of the product of the above procedure.

Calc'd. for $C_8H_{20}NO_3PS$: C, 39.8; H, 8.36. Found: C, 39.5; H, 8.69.

The product of either of the above procedures was then quaternized as in Reaction 2 in the following manner:

A mixture of phosphorothioic acid, O-ethyl, S-(2-diethylaminoethyl)ester, 3.25 g., 0.0135 mole, prepared as above, redistilled dimethyl sulfate, 1.70 g., 0.0135 mole, and 25 ml. of dry benzene was shaken mechanically for 6 hrs. and then allowed to stand 24 hrs. at room temperature. Two layers formed. The mixture was shaken vigorously, poured into a small separatory funnel, and the lower layer was drawn off. This was freed of residual benzene by heating at 50°/0.1 mm. for ½ hr. The yield was 3.40 g., 69 percent, of a light brown, viscous sirup.

Calc'd. for $C_{10}H_{26}NO_7PS_2$: C, 32.7; H, 7.13. Found: C, 33.5; H, 7.26.

The infrared absorption band wave lengths and relative intensities for this compound are given below. The data are obtained on the pure liquid phase as a squeeze between salt plates at a temperature of 25° C. from 2.0 to 15.0 microns.

| Wave Length In Microns | Relative Band Intensity |
|---|---|
| 3.33 | medium. |
| 3.70 | weak, broad. |
| 3.98 | very weak, side band broad. |
| 4.35 | very weak, broad. |
| 6.78 | medium, broad. |
| 7.15 | weak. |
| 7.99 | strong. |
| 8.34 | strong, broad. |
| 9.50 | weak. |
| 9.67 | very weak. |
| 9.92 | very strong. |
| 10.25 | very weak. |
| 10.50 | very weak, broad. |
| 12.30 | very weak, broad. |
| 13.30 | strong, broad. |
| 14.55 | very weak, broad. |

EXAMPLE 2

*Preparation of diethyl (2-hydroxyethyl)methyl-ammonium p-toluene sulfonate, S-ester with phosphorothioic acid, O-ethyl ester*

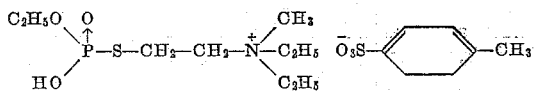

A mixture of phosphorothioic acid, O-ethyl, S-(2-diethylaminoethyl)ester, prepared as above (see Example 1), 3.00 g., 0.0128 mole; methyl p-toluenesulfonate, 2.48 g., 0.0128 mole, and 25 ml. of dry benzene was treated exactly as in Example 1. The bottom layer amounted to 3.78 g., 68 percent, after drying.

Calc'd. for $C_{16}H_{30}NO_6PS_2$: C, 45.0; H, 7.07. Found: C, 44.5; H, 8.15.

EXAMPLE 3

*Preparation of trimethyl (2-hydroxyethyl)ammounium iodide, S-ester with phosphorothioic acid, O-ethyl ester*

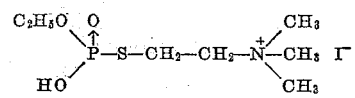

A mixture of 5 parts by weight of phosphorothioic acid O-ethyl, S-(2-dimethylaminoethyl) ester, and 10 parts by weight of methyl iodide is heated at 50° C. for 14 hours in a sealed vessel. After cooling the contents of the vessel to room temperature, the vessel is opened and heated to 50° C. whereupon excess methyl iodide vaporizes and is removed. The desired product remains in the reaction vessel. If it is to be used for pest control purposes, it is not necessary that it be refined further.

EXAMPLES 4 THROUGH 44

Using the general procedures outlined in Examples 1, 2 and 3, supra, the following examples of the preparation of compounds of this invention are given in tabular form. After reaction under the conditions described is carried out, the product remains in substantially pure condition. If the product is to be used as an insecticide, it is not necessary to refine it further.

| Ex. No. | Starting Material | Quaternizing Agent | Solvent | Product |
|---|---|---|---|---|
| 4 | Phosphorodithioic acid, O-ethyl, S-(2-diethylaminoethyl) ester, 25.7 parts. | Dimethyl sulfate, 12.6 parts. | Benzene, 50 parts. | Diethyl (2-hydroxyethyl) methylammonium methyl sulfate, S-ester with phosphorodithioic acid, O-ethyl ester. |

The reaction mixture is shaken 24 hrs. at room temp. The benzene is removed by distillation in vacuo

| Ex. No. | Starting Material | Quaternizing Agent | Solvent | Product |
|---|---|---|---|---|
| 5 | Phosphorothioic acid, O-ethyl, S-(2-diethylaminoethyl) ester, 24.1 parts. | Diethyl sulfate, 15.4 parts. | Benzene, 50 parts. | Triethyl (2-hydroxyethyl) ammonium ethyl sulfate, S-ester with phosphorothioic acid, O-ethyl ester. |

The reaction mixture is stirred and heated 8.5 hrs. at 50°. The benzene is removed by distillation in vacuo

| Ex. No. | Starting Material | Quaternizing Agent | Solvent | Product |
|---|---|---|---|---|
| 6 | Phosphorodithioic acid, O-ethyl, S-(2-diethylaminoethyl) ester, 25.7 parts. | Diethyl sulfate, 15.4 parts. | Toluene, 50 parts. | Triethyl (2-hydroxyethyl) ammonium ethyl sulfate, S-ester with phosphorodithioic acid, O-ethyl ester. |

The reaction mixture is stirred and heated 8.5 hrs. at 50°. The toluene is removed by distillation in vacuo

| Ex. No. | Starting Material | Quaternizing Agent | Solvent | Product |
|---|---|---|---|---|
| 7 | Phosphorodithioic acid, O-ethyl, S-(2-diethylaminoethyl) ester, 25.7 parts. | Methyl p-toluene-sulfonate, 18.6 parts. | Chloroform, 50 parts. | Diethyl (2-hydroxyethyl) methylammonium p-toluenesulfonate, S-ester with phosphorodithioic acid, O-ethyl ester. |

The reaction mixture is shaken 36 hrs. at room temp. The chloroform is removed by distillation in vacuo

| Ex. No. | Starting Material | Quaternizing Agent | Solvent | Product |
|---|---|---|---|---|
| 8 | Phosphorothioic acid, O-ethyl, S-(2-diethylaminoethyl) ester, 24.1 parts. | Ethyl p-toluene-sulfonate, 20.0 parts. | Chloroform, 50 parts. | Triethyl (2-hydroxyethyl) ammonium p-toluenesulfonate, S-ester with phosphorothioic acid, O-ethyl ester. |

The reaction mixture is refluxed 6 hrs. The chloroform is removed by distillation in vacuo

| Ex. No. | Starting Material | Quaternizing Agent | Solvent | Product |
|---|---|---|---|---|
| 9 | Phosphorodithioic acid, O-ethyl, S-(2-diethylaminoethyl) ester, 25.7 parts. | Ethyl p-toluenesulfonate, 20.0 parts. | Toluene, 50 parts. | Triethyl (2-hydroxyethyl) ammonium p-toluenesulfonate, S-ester with phosphorodithioic acid, O-ethyl ester. |

Reaction mixture is stirred and heated 11 hrs. at 50°. The toluene is removed by distillation in vacuo

| Ex. No. | Starting Material | Quaternizing Agent | Solvent | Product |
|---|---|---|---|---|
| 10 | Phosphorothioic acid, O-ethyl, S-(2-diethylaminoethyl) ester, 24.1 parts. | Methyl benzenesulfonate, 17.2 parts. | Diethyl ether, 50 parts. | Diethyl (2-hydroxyethyl) methylammonium benzenesulfonate, S-ester with phosphorothioic acid, O-ethyl ester. |

Reaction mixture is shaken 36 hrs. at room temp. The ether is removed by evaporation in a stream of dry air

| Ex. No. | Starting Material | Quaternizing Agent | Solvent | Product |
|---|---|---|---|---|
| 11 | Phosphorodithioic acid, O-ethyl, S-(2-diethylaminoethyl) ester, 25.7 parts. | Methyl benzenesulfonate, 17.2 parts. | Dibutyl ether, 50 parts. | Diethyl (2-hydroxyethyl) methylammonium benzenesulfonate, S-ester with phosphorodithioic acid, O-ethyl ester. |
| | Reaction mixture is stirred and heated 3 hrs. at 60°. The dibutyl ether is removed by distillation in vacuo | | | |
| 12 | Phosphorothioic acid, O-ethyl, S-(2-diethylaminoethyl) ester, 24.1 parts. | Ethyl benzenesulfonate, 18.6 parts. | Peroxide-free tetrahydrofuran, 50 parts. | Triethyl (2-hydroxyethyl) ammonium benzenesulfonate, S-ester with phosphorothioic acid, O-ethyl ester. |
| | Reaction mixture is refluxed 4.5 hrs. The tetrahydrofuran is removed by distillation in vacuo | | | |
| 13 | Phosphorodithioic acid, O-ethyl, S-(2-diethylaminoethyl) ester, 25.7 parts. | Ethyl benzenesulfonate, 18.6 parts. | Benzene, 50 parts. | Triethyl (2-hydroxyethyl) ammonium benzenesulfonate, S-ester with phosphorodithioic acid, O-ethyl ester. |
| | The reaction mixture is refluxed 2 hrs. The benzene is removed by distillation in vacuo | | | |
| 14 | Phosphorothioic acid, O-ethyl, S-(2-dimethylaminoethyl) ester, 21.3 parts. | Dimethyl sulfate, 12.6 parts. | Carbon tetrachloride, 50 parts. | Trimethyl (2-hydroxyethyl) ammonium methyl sulfate, S-ester with phosphorothioic acid, O-ethyl ester. |
| | The reaction mixture is refluxed 1 hr. The carbon tetrachloride is removed by distillation in vacuo | | | |
| 15 | Phosphorodithioic acid, O-ethyl, S-(2-dimethylaminoethyl) ester, 22.9 parts. | Dimethyl sulfate, 12.6 parts. | Toluene, 50 parts. | Trimethyl (2-hydroxyethyl) ammonium methyl sulfate, S-ester with phosphorodithioic acid, O-ethyl ester. |
| | The reaction mixture is refluxed 10 min. The toluene is removed by distillation in vacuo | | | |
| 16 | Phosphorothioic acid, O-ethyl, S-(2-dimethylaminoethyl) ester, 21.3 parts. | Diethyl sulfate, 15.4 parts. | Chloroform, 50 parts. | Dimethyl (2-hydroxyethyl) ethylammonium ethyl sulfate, S-ester with phosphorothioic acid, O-ethyl ester. |
| | The reaction mixture is refluxed 4.5 hrs. The chloroform is removed by distillation in vacuo | | | |
| 17 | Phosphorodithioic acid, O-ethyl, S-(2-dimethylaminoethyl) ester, 22.9 parts. | Diethyl sulfate, 15.4 parts. | Xylene, 50 parts. | Dimethyl (2-hydroxyethyl) ethylammonium ethyl sulfate, S-ester with phosphorodithioic acid, O-ethyl ester. |
| | The reaction mixture is stirred 48 hrs. at room temp. The product is extracted with water which is removed by distillation in vacuo | | | |
| 18 | Phosphorodithioic acid, O-ethyl, S-(2-dimethylaminoethyl) ester, 22.9 parts. | Methyl iodide, 28.2 parts. | No solvent. | Trimethyl (2-hydroxyethyl) ammonium iodide, S-ester with phosphorodithioic acid, O-ethyl ester. |
| | The reaction is carried out as in Example 3 | | | |
| 19 | Phosphorothioic acid, O-ethyl, S-(2-diethylaminoethyl) ester, 24.1 parts. | Methyl chloride, 6.30 parts. | No solvent. | Diethyl (2-hydroxyethyl) methylammonium chloride, S-ester with phosphorothioic acid, O-ethyl ester. |
| | The reactants are combined at −40° in a sealed vessel. This is heated 4 hrs. at 90° cooled to −40°, the vessel is opened, and the excess methyl chloride is allowed to vaporize on warming to room temp. | | | |
| 20 | Phosphorodithioic acid, O-ethyl, S-(2-diethylaminoethyl) ester, 25.7 parts. | Methyl chloride, 6.30 parts. | No solvent. | Diethyl (2-hydroxyethyl) methylammonium chloride, S-ester with phosphorodithioic acid, O-ethyl ester. |
| | The reaction is carried out as in Example 19 | | | |
| 21 | Phosphorothioic acid, O-ethyl, S-(2-diethylaminoethyl) ester, 24.1 parts. | Methyl bromide, 11.9 parts. | No solvent. | Diethyl (2-hydroxyethyl) methylammonium bromide, S-ester with phosphorothioic acid, O-ethyl ester. |
| | The reactants are combined at 0° in a sealed vessel. This is heated 4 hrs. at 80°, cooled to 0°, the vessel is opened, and the excess methyl bromide is allowed to vaporize on warming to room temp. | | | |
| 22 | Phosphorodithioic acid, O-ethyl, S-(2-diethylaminoethyl) ester, 25.7 parts. | Methyl bromide, 11.9 parts. | No solvent. | Diethyl (2-hydroxyethyl) methylammonium bromide, S-ester with phosphorodithioic acid, O-ethyl ester. |
| | The reaction is carried out as in Example 21 | | | |
| 23 | Phosphorothioic acid, O-ethyl, S-(2-diethylaminoethyl) ester, 24.1 parts. | Ethyl chloride, 8.05 parts. | No solvent. | Triethyl (2-hydroxyethyl) ammonium chloride, S-ester with phosphorothioic acid, O-ethyl ester. |
| | The reaction is carried out as in Example 21, except that the sealed vessel is heated 5.5 hrs. at 85° | | | |

| Ex. No. | Starting Material | Quaternizing Agent | Solvent | Product |
|---|---|---|---|---|
| 24 | Phosphorodithioic acid, O-ethyl, S-(2-diethylaminoethyl) ester, 25.7 parts. | Ethyl chloride, 8.05 parts | No solvent | Triethyl (2-hydroxyethyl) ammonium chloride, S-ester with phosphorodithioic acid, O-ethyl ester. |
| | The reaction is carried out as in Example 23 | | | |
| 25 | Phosphorothioic acid, O-ethyl, S-(2-diethylaminoethyl) ester, 24.1 parts. | Ethyl bromide, 13.7 parts | Diethyl ether, 50 parts | Triethyl (2-hydroxyethyl) ammonium bromide, S-ester with phosphorothioic acid, O-ethyl ester. |
| | The reaction mixture is stirred and refluxed 45 hrs. The solvent and excess ethyl bromide are removed by concentration in vacuo | | | |
| 26 | Phosphorodithioic acid, O-ethyl, S-(2-diethylaminoethyl) ester, 25.7 parts. | Ethyl bromide, 13.7 parts | Diethyl ether, 50 parts | Triethyl (2-hydroxyethyl) ammonium bromide, S-ester with phosphorodithioic acid, O-ethyl ester. |
| | The reaction is carried out as in Example 25 | | | |
| 27 | Phosphorothioic acid, O-ethyl, S-(2-diethylaminoethyl) ester, 24.1 parts. | Ethyl iodide, 31.0 parts | No solvent | Triethyl (2-hydroxyethyl) ammonium iodide, S-ester with phosphorothioic acid, O-ethyl ester. |
| | The reactants are combined and refluxed 4 hrs. The excess ethyl iodide is evaporated in a stream of dry air after cooling to room temp. | | | |
| 28 | Phosphorodithioic acid, O-ethyl, S-(2-diethylaminoethyl) ester, 25.7 parts. | Ethyl iodide, 31.0 parts | No solvent | Triethyl (2-hydroxyethyl) ammonium iodide, S-ester with phosphorodithioic acid, O-ethyl ester. |
| | The reaction is carried out as in Example 27 | | | |
| 29 | Phosphorothioic acid, O-methyl, S-(2-dimethylaminoethyl) ester, 19.9 parts. | Dimethyl sulfate, 12.6 parts | Benzene, 50 parts | Trimethyl (2-hydroxyethyl) ammonium methyl sulfate, S-ester with phosphorothioic acid, O-methyl ester. |
| | The reaction mixture is stirred and heated 2 hrs. at 60°. The benzene is removed by distillation in vacuo | | | |
| 30 | Phosphorothioic acid, O-(sec.-butyl), S-(2-diallylaminoethyl) ester, 29.3 parts. | Dibutyl sulfate, 21.0 parts | Toluene, 50 parts | Diallyl (2-hydroxyethyl) butylammonium butyl sulfate, S-ester with phosphorothioic acid, O-(sec.-butyl) ester. |
| | The reaction mixture is stirred and heated 4 hrs. at 80°. The toluene is removed by distillation in vacuo | | | |
| 31 | Phosphorodithioic acid, O-(2-methylallyl), S-(2-diisobutylaminoethyl) ester, 33.9 parts. | Propyl benzenesulfonate, 20.0 parts. | Hexane, 50 parts | Diisobutyl (2-hydroxyethyl) propylammonium benzenesulfonate, S-ester with phosphorodithioic acid, O-(2-methylallyl) ester. |
| | The reaction mixture is stirred and refluxed 48 hrs. The hexane is removed by evaporation in a stream of dry air | | | |
| 32 | Phosphorothioic acid, O-isopropyl, S-(3-dimethylaminopropyl) ester, 24.1 parts. | Allyl o-toluenesulfonate, 21.2 parts. | Benzene, 50 parts | Dimethyl (3-hydroxypropyl) allylammonium o-toluenesulfonate, S-ester with phosphorothioic acid, O-isopropyl ester. |
| | The reaction mixture is stirred and heated 36 hrs. at 35°. The benzene is removed by distillation in vacuo | | | |
| 33 | Phosphorodithioic acid, O-benzyl, S-(4-dimethylaminobutyl) ester, 31.9 parts. | Methyl chloride, 6.30 parts | No solvent | Trimethyl (4-hydroxybutyl) ammonium chloride, S-ester with phosphorodithioic acid, O-benzyl ester. |
| | The reaction is carried out as in Example 19 | | | |
| 34 | Phosphorothioic acid, O-phenyl, S-(3-dimethylamino-2-methylpropyl) ester, 28.9 parts. | Propyl bromide, 24.6 parts | Benzene, 50 parts | Dimethyl (3-hydroxy-2-methylpropyl) propylammonium bromide, S-ester with phosphorothioic acid, O-phenyl ester. |
| | The reaction is carried out as in Example 25 except that the mixture is refluxed 9 hrs. | | | |
| 35 | Phosphorothioic acid, O-phenyl, S-(2-diethylaminoethyl) ester, 28.9 parts. | Dimethyl sulfate, 12.6 parts | Benzene, 50 parts | Diethyl (2-hydroxyethyl) methylammonium methyl sulfate, S-ester with phosphorothioic acid, O-phenyl ester. |
| | The reaction mixture is refluxed 30 min. The product is extracted with water, which is removed by distillation in vacuo | | | |
| 36 | Phosphorothioic acid, O-(p-nitrophenyl), S-(2-diethylaminoethyl) ester, 33.4 parts. | Methyl p-toluenesulfonate, 18.6 parts. | Benzene, 50 parts | Diethyl (2-hydroxyethyl) methylammonium p-toluenesulfonate, S-ester with phosphorothioic acid, O-(p-nitrophenyl) ester. |
| | The reaction mixture is stirred and heated at 55° for 4 hrs. The benzene is removed by distillation in vacuo | | | |

| Ex. No. | Starting Material | Quaternizing Agent | Solvent | Product |
|---|---|---|---|---|
| 37 | Phosphorodithioic acid, O-(o-chlorophenyl), S-(2-dimethylaminoethyl) ester, 31.2 parts. | Propyl iodide, 34.0 parts. | Benzene, 50 parts. | Dimethyl (2-hydroxyethyl) propylammonium iodide, S-ester with phosphorodithioic acid, O-(o-chlorophenyl) ester. |

The reaction is carried out as in Example 25 except that the mixture is refluxed 8 hrs.

| Ex. No. | Starting Material | Quaternizing Agent | Solvent | Product |
|---|---|---|---|---|
| 38 | Phosphorothioic acid, O-(o-tolyl), S-(2-dimethylaminoethyl) ester, 27.5 parts. | tert.-Butyl benzenesulfonate, 21.4 parts. | Toluene, 50 parts. | Dimethyl (2-hydroxyethyl) tert.-butylammonium benzenesulfonate, S-ester with phosphorothioic acid, O-(o-tolyl) ester. |

The reaction mixture is heated 24 hrs. at 60°. The toluene is removed by distillation in vacuo

| Ex. No. | Starting Material | Quaternizing Agent | Solvent | Product |
|---|---|---|---|---|
| 39 | Phosphorothioic acid, O-benzyl, S-(2-dimethylaminoethyl) ester, 27.5 parts. | Dimethyl sulfate, 12.6 parts. | Diethyl ether, 50 parts. | Trimethyl (2-hydroxyethyl) ammonium methyl sulfate, S-ester with phosphorothioic acid, O-benzyl ester. |

The reaction mixture is shaken 24 hrs. at room temp. The ether is removed by evaporation in a stream of dry air

| Ex. No. | Starting Material | Quaternizing Agent | Solvent | Product |
|---|---|---|---|---|
| 40 | Phosphorodithioic acid, O-methyl, S-[2-(1-pyrrolidino) ethyl] ester, 24.1 parts. | Methyl p-toluenesulfonate, 18.6 parts. | Diethyl ether, 50 parts. | 1-Methyl-1-(2-hydroxyethyl) pyrrolidinium methyl sulfate, S-ester with phosphorodithioic acid, O-methyl ester. |

The reaction mixture is shaken 36 hrs. at room temp. The ether is removed by distillation in vacuo

| Ex. No. | Starting Material | Quaternizing Agent | Solvent | Product |
|---|---|---|---|---|
| 41 | Phosphorothioic acid, O-butyl, S-[3-(1-piperidino) propyl] ester, 29.5 parts. | Diethyl sulfate, 15.4 parts. | No solvent. | 1-Ethyl-1-(3-hydroxypropyl) piperidinium ethyl sulfate, S-ester with phosphorothioic acid, O-butyl ester. |

The reactants are combined (no solvent) and heated 6 hrs. at 55°

| Ex. No. | Starting Material | Quaternizing Agent | Solvent | Product |
|---|---|---|---|---|
| 42 | Phosphorothioic acid, O-ethyl, S-[2-(1-piperazino) ethyl] ester, 25.4 parts. | Methyl chloride, 6.30 parts. | No solvent. | 1-Methyl-1-(2-hydroxyethyl) piperazinium chloride, S-ester with phosphorothioic acid, O-ethyl ester. |

The reaction is carried out as in Example 19

| Ex. No. | Starting Material | Quaternizing Agent | Solvent | Product |
|---|---|---|---|---|
| 43 | Phosphorodithioic acid, O-methyl, S-[2-(1-morpholino) ethyl] ester, 25.7 parts. | Ethyl iodide, 31.0 parts. | No solvent. | 1-Ethyl-1-(2-hydroxyethyl) morpholinium iodide, S-ester with phosphorodithioic acid, O-methyl ester. |

The reaction is carried out as in Example 27

| Ex. No. | Starting Material | Quaternizing Agent | Solvent | Product |
|---|---|---|---|---|
| 44 | Phosphorodithioic acid, O-methyl, S-[2-di-(2-methylallyl) aminoethyl] ester, 29.5 parts. | Methyl bromide, 11.9 parts. | No solvent. | Methyl di-(2-methylallyl) (2-hydroxyethyl) ammonium bromide, S-ester with phosphorodithioic acid, O-methyl ester. |

The reaction is carried out as in Example 21

The following examples illustrate the formulation and use of the compounds of the invention as insecticides.

EXAMPLE 45

Diethyl (2-hydroxyethyl)methylammonium methyl sulfate, S-ester with phosphorothioic acid, O-butyl ester is admixed with 20 percent by weight of a proprietary wetting, dispersing and emulsifying agent having as its effective ingredient polyethylene oxide modified sorbitan monolaurate.

The formulation thus prepared is readily soluble in water to obtain aqueous spray compositions which are highly effective when applied to growing crops for the control of a wide variety of insects such as mites, aphids, southern armyworms, and onion thrips.

A spray composition suitable for application to fruit trees is prepared by dissolving 16 ounces of the formulation of this example in 100 gallons of water. This gives excellent control of mites, green apple aphids, scale insects and other insects when used in an orchard of mixed fruit species, that is, containing plum, peach, apple and cherry trees.

The spray composition described above also gives excellent control of insects including mites, aphids, and yellow-striped armyworms when applied to growing cotton plants in fields infested with these species.

EXAMPLE 46

An insecticidal dust is prepared by admixing triisopropyl (2-hydroxyethyl)ammonium bromide, S-ester with phosphorodithioic acid, O-ethyl ester with talc in the proportions of about 32 parts by weight of talc for each part by weight of the organophosphorus ester.

This dust composition is free-flowing and is easily broadcast over an area to be protected from infestation by mites and other insects. When this composition is applied to an insect-infested bean field at the rate of 1 pound of active ingredient per acre, excellent control of the infestation (Mexican bean beetles, mites, and the like) is obtained.

EXAMPLE 47

A water-dispersible insecticidal powder is obtained by blending a compound of the invention with an adsorbent carrier, a diluent and surfactants in the following proportions by weight:

25% dipropyl (3-hydroxypropyl)ethylammonium iodide, S-ester with phosphorothioic acid, O-isopropyl ester
73% diatomaceous earth (adsorbent carrier and diluent)
1% low viscosity methylcellulose (dispersing agent)
1% cetyl trimethylammonium bromide (wetting agent)

The water-dispersible powdered composition of this example is free flowing and is easily dispersed in water to give a relatively stable suspension in an aqueous spray composition. An excellent spray composition suitable for application to apple trees for the control of mites is obtained by dispersing from 2 to 16 of the composition of this example in 100 gallons of water. Excellent control of mites is obtained using 8 ounces per 100 gallons of water.

The following examples illustrate the outstanding insecticidal activity of the compounds of this invention.

EXAMPLE 48

In order to illustrate the systemic action of a typical compound of the invention, 100 ml. of a solution containing 0.005 percent by weight of diethyl (2-hydroxyethyl)methylammonium methyl sulfate, S-ester with phosphorothioic acid, O-ethyl ester was poured onto the soil surface in each of a number of four-inch clay pots containing two red kidney bean plants approximately 4 inches tall. The pots of beans were subsequently infested with two-spotted mites two, three and four days after treatment. Mortality counts of adults mites were made on the second day following the mite infestations. It was found that 60 percent of the mites applied two days after treatment were dead at the time the mortality count was made, 98 percent of the mites applied three days after treatment were dead at that time and 96 percent of the mites applied four days after treatment were dead at the time of mortality count.

EXAMPLE 49

This example illustrates the startling retention of insecticidal activity from foliar sprays.

Five-year old Golden Delicious apple trees were sprayed to the run-off point with an aqueous solution containing ½ ounce of the compound of Example 1 per 100 gallons of spray. Leaves of these trees were heavily infested with two-spotted mites prior to the spray application. Mortality counts of adults mites were made periodically following the spray application. It was found that excellent control (in excess of 98% mortality) was obtained for a period of 38 days, and that satisfactory control (in excess of 90% mortality) was obtained for 76 days.

EXAMPLE 50

The excellent contact action of the compounds of this invention is illustrated by the fact that an aqueous solution containing as the active ingredient only 0.00025 percent by weight of the product of Example 1 above, applied to the run-off point, was found to give 95 percent kill of two-spotted mites infesting bean plants, and aqueous solutions containing 0.001 percent or more of the product gave 100 percent kill of such mites. An aqueous solution containing only 0.004 percent of the product gave 97 percent kill of bean aphids infesting nasturtium leaves.

EXAMPLE 51

The varied insecticidal activity of the compounds of the invention is illustrated by other evaluations in which it was found, for example, that the compound of Example 1 when applied as a 2 percent aqueous solution effected 100 percent kill of such insects as adult housefly, German roach nymph, adult confused flower beetle, black carpet beetle larvae, adult granary weevil, and bean aphid.

The claims are:

1. Di-O,S-hydrocarbon esters of phosphorothioic acid and phosphorodithioic acid represented by the formula

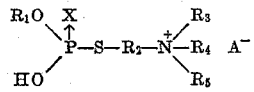

where:
X is selected from the group consisting of oxygen and sulfur.
$R_1$ is selected from the group consisting of alkyl radicals of from 1 to 4 carbon atoms, inclusive, alkenyl of 2 to 4 carbon atoms, benzyl, phenyl, halophenyl, nitrophenyl, and tolyl radicals.
$R_2$ is an alkylene radical of 2 to 4 carbon atoms.
$R_3$ is selected from the group consisting of alkyl radicals of 1 to 4 carbon atoms, inclusive, and alkenyl radicals of 2 to 4 carbon atoms.
$R_4$ and $R_5$ are the same and are selected from the group consisting of alkyl radicals of 1 to 4 carbon atoms, inclusive, and alkenyl radicals of 2 to 4 carbon atoms, with the proviso that $R_4$ and $R_5$ can be taken together to form, with the included nitrogen, a ring selected from the group consisting of pyrrolidine, piperidine, piperazine, and morpholine.
A is selected from the group consisting of halogen, alkyl sulfate of from 1 to 4 carbon atoms, inclusive, benzenesulfonate, and toluenesulfonate.

2. An insecticidal composition comprising, in an insecticidally effective amount, at least one compound described in claim 1, and an inert carrier.

3. An insecticidal composition according to claim 2 containing an insecticidally inert powder as a carrier.

4. An insecticidal composition according to claim 2 containing a surface-active dispersing agent as a carrier.

5. A method of controlling insects which comprises applying to the locus to be protected, in an amount sufficient to exert insecticidal action, a compound described in claim 1.

References Cited in the file of this patent

UNITED STATES PATENTS

| | | |
|---|---|---|
| 1,711,696 | Schoeller et al. | May 7, 1929 |
| 2,006,227 | Bousquet | June 25, 1935 |
| 2,736,726 | Gaetzi et al. | Feb. 28, 1956 |

FOREIGN PATENTS

| | | |
|---|---|---|
| 1,004,898 | France | Dec. 5, 1951 |

OTHER REFERENCES

Baer et al.: "J. Am. Chem. Soc." 70, 1394–1399 (1948).